Patented May 12, 1942

2,282,969

UNITED STATES PATENT OFFICE 2,282,969

BIOLOGICAL PRODUCT AND METHOD OF OBTAINING SAME

Charles G. King, Pittsburgh, Pa., assignor to The University of Pittsburgh, Pittsburgh, Pa.

No Drawing. Application November 4, 1938, Serial No. 238,911

4 Claims. (Cl. 167—66)

This invention relates to the isolation of fractions of the oily constituents of animal and vegetable products which do not contain water-soluble vitamin C but which can be administered to certain animals for their biosynthesis therefrom of vitamin C or compounds having vitamin C activity.

It is known that animals, such as the rat and the dog, are not subject to scurvy even when fed on a diet which produces scurvy in other animals, such as the guinea pig. There are theories that animals, such as the rat and the dog, either synthesize vitamin C from substances in the diet which are the precursors of vitamin C or that substances are present in the diet which act as catalysts in stimulating the body tissues to convert certain carbohydrates into the vitamin. Thus far none of the hypothetical precursor substances have been found.

An object of this invention is to provide water-insoluble products derived from natural oils, or animal or vegetable tissues containing the same, which can be utilized by the animal organism for the production of antiscorbutic activity.

Another object of the invention is to provide a method by which products stimulating production of vitamin C in the organism are obtained from natural sources.

A further object of the invention is to provide new antiscorbutic substances which may be obtained from the secretions of certain animals treated with the water-insoluble products previously mentioned.

I have found that lipoidal or oily extracts of numerous animal or vegetable tissues containing water-insoluble substances capable of being utilized by animals for production of antiscorbutic activity may be obtained by treating said tissues with a lipoid solvent to obtain an extract which can be further treated to separate out a fraction capable of being utilized as mentioned. In carrying out the invention, the fraction thus obtained may be utilized either for preventing scurvy in the animal organism or, by feeding it to suitable animals, causing production in the urine or milk or like secretions of the animal of antiscorbutic substances which may themselves be isolated and used for preventing scurvy and/or used for similar or related therapeutic purposes. Even the urine or milk or other secretion, when administered to the animal organism, such as the guinea pig, is capable of preventing scurvy.

In carrying out the invention, any suitable animal or vegetable tissue may be used. For example, oats or similar cereals, or oils obtained therefrom, alfalfa and other forage plants, and the low-boiling fractions from fish liver oils may be used. The original oil may have been partially or practically completely saponified for the removal of certain inert substances. However, saponification is not necessary. In fact, I prefer to use alfalfa to directly obtain a lipoidal extract therefrom which can be further treated by physical means to isolate the particular oily fraction containing, or consisting of, the substances capable of producing antiscorbutic activity in the organism.

The invention may be illustrated by the following examples:

Example 1

Alfalfa dried artificially under conditions that prevent oxidation reactions is extracted with a solvent, such as petroleum ether, capable of extracting fats and other lipid material. The extracted oily residue, after evaporating off solvent, is then subjected to distillation in vacuum and fractions collected which boil substantially below the boiling point of the known fat-soluble vitamins. The fraction thus obtained is highly active in vitamin C precursor substance.

By fractional distillation it is possible to obtain oily products which are substantially chemically pure substances. For instance, the above example has been carried out and a fraction consisting of an oil boiling at 96–98° C. at 19 mm. pressure has been obtained. This product is highly active when administered to rats.

Example 2

A modification of the method described in Example 1 above relates to removal of chlorophyll during the process by subjecting the extract while still in solution to various adsorbents for chlorophyll. Among those which have been useful are magnesium oxide, artificial zeolites, such as permutit, etc. The adsorbents take up the chlorophyll, as well as the desired active fraction. The impurities may be removed by washing the adsorbent with successive portions of solvent, such as petroleum ether. Subsequently, the fraction containing the vitamin precursor is separately removed with solvents, such as benzol and alcohol. Other combinations of similar solvents can be used to separately desorb impurities and the vitamin precursor. After the product has been freed from large quantities of chlorophyll by adsorption as described, it may be submitted to vacuum distillation, as described in Example 1.

Adsorption and desorption operations of the kind specified are usually conducted by packing the adsorbent in a column, passing through the column of adsorbent a solution containing the desired product, along with impurities, until the level of the solution approaches the upper surface of the column of the adsorbent, at which point the various solvents intended for elution and separation of the desired substance are poured on to the top of the column and allowed to pass through it while various desorbed fractions are collected at the bottom of the column. The various fractions can be determined by trial and can be based upon the volume collected or, when the fractions vary in color, often by collecting fractions of different colors. These are well known methods for adsorbing and fractionally desorbing various natural products to obtain separation of different constituents.

The method used for the study of my precursor substances on laboratory animals and for evaluating the potency of any given fraction is as follows: Young or adult albino rats are kept in raised-bottom cages of the usual type, below which a fine screen and funnel serve to collect the urine into small vials. The vials contain enough metaphosphoric acid to provide a final concentration of approximately 3 percent. The samples are removed and titrated with 2,6-dichlorophenolindophenol or other satisfactory chemical indicator once each day to provide a measure of vitamin C excretion. Animals fed a stock diet of Purina chow or Sherman's diet No. 13 show a sharp drop in vitamin C excretion during inanition, or a more gradual drop when placed on a diet of condensed milk. Hence, after a short period of inanition (3 to 4 days) and an additional period (generally 3 to 6 days) on condensed milk, they are in a suitable condition for assay purposes. The animals are then fed the test supplement of vitamin C precursor substance plus a basal diet of condensed milk.

The common purified foodstuffs such as sugars, proteins and oils and also fatty acids and the common sterols do not affect the rate of vitamin C excretion and apparently do not contain the precursor substance. Alfalfa oil, oat oil, the unsaponifiable matter from oat oil, and certain fractions of fish liver oils induce a high rate of excretion of vitamin C that may exceed 2 mg. and reach 10 milligrams or more per day in the rat.

The purified active fractions referred to in the examples produce similar effects except they are far more potent than the materials from which they have been prepared; for example, as little as 10 mg. per day may lead to an increase of 5 mg. per day in urinary excretion of vitamin C. Comparable elimination with respect to the time and extent of response is obtained by feeding pure vitamin C to the rat.

The vitamin C precursor may possibly be of value in nutrition even of those animals which are subject to scurvy. Its use may be indicated in the feeding of dairy animals with the object of increasing the concentration of vitamin C in the milk.

In obtaining the products stimulating production of antiscorbutic activity it may be preferable, in some instances, although it is not necessary, to collect oily fractions of natural tissues boiling below the boiling point of the known fat-soluble vitamins. My new products may also be present to a certain extent when collecting higher boiling oily fractions. I have some evidence which indicates that more than one substance obtainable from alfalfa oil is capable of acting as a vitamin C precursor; for example, some of the higher-boiling fractions from alfalfa fat and from fish liver oils behave similarly to the product of the example above and which boils at 96-98° C. at 19 mm. pressure of mercury.

What I claim as my invention is:

1. An oily fraction of alfalfa boiling at about 98° C. at 19 mm. pressure of mercury and capable when administered to an animal organism of causing production by said organism of antiscorbutic activity.

2. Process for the preparation of products which comprises extracting dried alfalfa with a fat solvent to obtain an extract, removing chlorophyll from said extract by preferential adsorption, removing with solvents a fraction containing vitamin C-stimulating activity, removing said solvents to obtain an oily residue and vacuum distilling said residue to obtain a fraction boiling at about 98° C. at 19 mm. pressure of mercury and capable when administered to an animal organism of causing production by said organism of antiscorbutic activity.

3. An oily fraction derived from vegetable tissue of the class consisting of cereals and forage plants which has a boiling point below the boiling point of the known fat-soluble vitamins A, D, E, and K and capable when administered to an animal organism of stimulating the production of increased anti-scorbutic activity in excretions from said organism.

4. Process for the preparation of therapeutic products which comprises extracting vegetable tissue of the class consisting of cereals and forage plants with the fat solvent to obtain an extract, removing chlorophyll from said extract by preferential adsorption, removing with solvents a fraction containing vitamin C-stimulating activity, removing said solvents to obtain an oily residue and vacuum distilling said residue to obtain a fraction having a boiling point below the boiling point of the known fat-soluble vitamins A, D, E, and K and capable when administered to an animal organism of causing production by said organism of anti-scorbutic activity.

CHARLES G. KING.